United States Patent [19]
Bonnifait et al.

[11] Patent Number: 5,359,609
[45] Date of Patent: Oct. 25, 1994

[54] QUALITY CHECK EQUIPMENTS FOR DIGITAL TRANSMISSION LINKS

[75] Inventors: Michel Bonnifait, Lannion; René Garandel; Jean-Yves Tremel, both of Pleumeur-Bodou, all of France

[73] Assignee: French State Represented by the Minister of the Post, Telecommunications and Space Centre National D'Etudes des Telecommunications, Issy-les-Moulineaux, France

[21] Appl. No.: 684,910

[22] PCT Filed: Sep. 7, 1990

[86] PCT No.: PCT/FR90/00595
§ 371 Date: May 2, 1991
§ 102(e) Date: May 2, 1991

[87] PCT Pub. No.: WO91/03893
PCT Pub. Date: Mar. 21, 1991

[30] Foreign Application Priority Data
Sep. 8, 1989 [FR] France .................. 89 11778

[51] Int. Cl.$^5$ .................................................. H04L 1/24
[52] U.S. Cl. .................................. 371/20.1; 370/14; 370/15; 371/20.5
[58] Field of Search ................ 371/20.1, 34, 32, 5.1, 371/20.5, 20.4; 370/15, 14

[56] References Cited
U.S. PATENT DOCUMENTS

| | | | |
|---|---|---|---|
| 3,605,091 | 9/1971 | Tong | 371/34 |
| 3,934,224 | 1/1976 | Dulaney et al. | 371/5.1 X |
| 4,439,859 | 3/1984 | Donnan | 371/32 |

FOREIGN PATENT DOCUMENTS

| | | |
|---|---|---|
| 0093648 | 11/1983 | European Pat. Off. . |
| 0327747 | 8/1989 | European Pat. Off. . |
| 88/09590 | 12/1988 | World Int. Prop. O. . |

*Primary Examiner*—Stephen M. Baker
*Attorney, Agent, or Firm*—Jacobson, Price, Holman & Stern

[57] ABSTRACT

An equipment embodying the invention is designed for bit-level quality check of a digital link in the presence of real traffic. The equipment complies with CCITT recommendations and comprises two checking stations (SP, SS) respectively located at two ends of the digital link (LT) and connected to one another by a service link (LS). First and second check information relating respectively to groups of transmitted frames ($MTn_p$) and to groups of received frames ($MTn_s$) are calculated in the stations and comparisons are made in order to detect the transmission errors. The check informations and the frame groups concerned by the transmission errors are transmitted from one station to the other via the service link. Processing circuits are distributed among the stations thereby processing the frame groups concerned by the transmission errors, i.e., analyzing at bit level the errors in the erroneous frames and deriving statistical information and recordings relating to said errors.

8 Claims, 6 Drawing Sheets

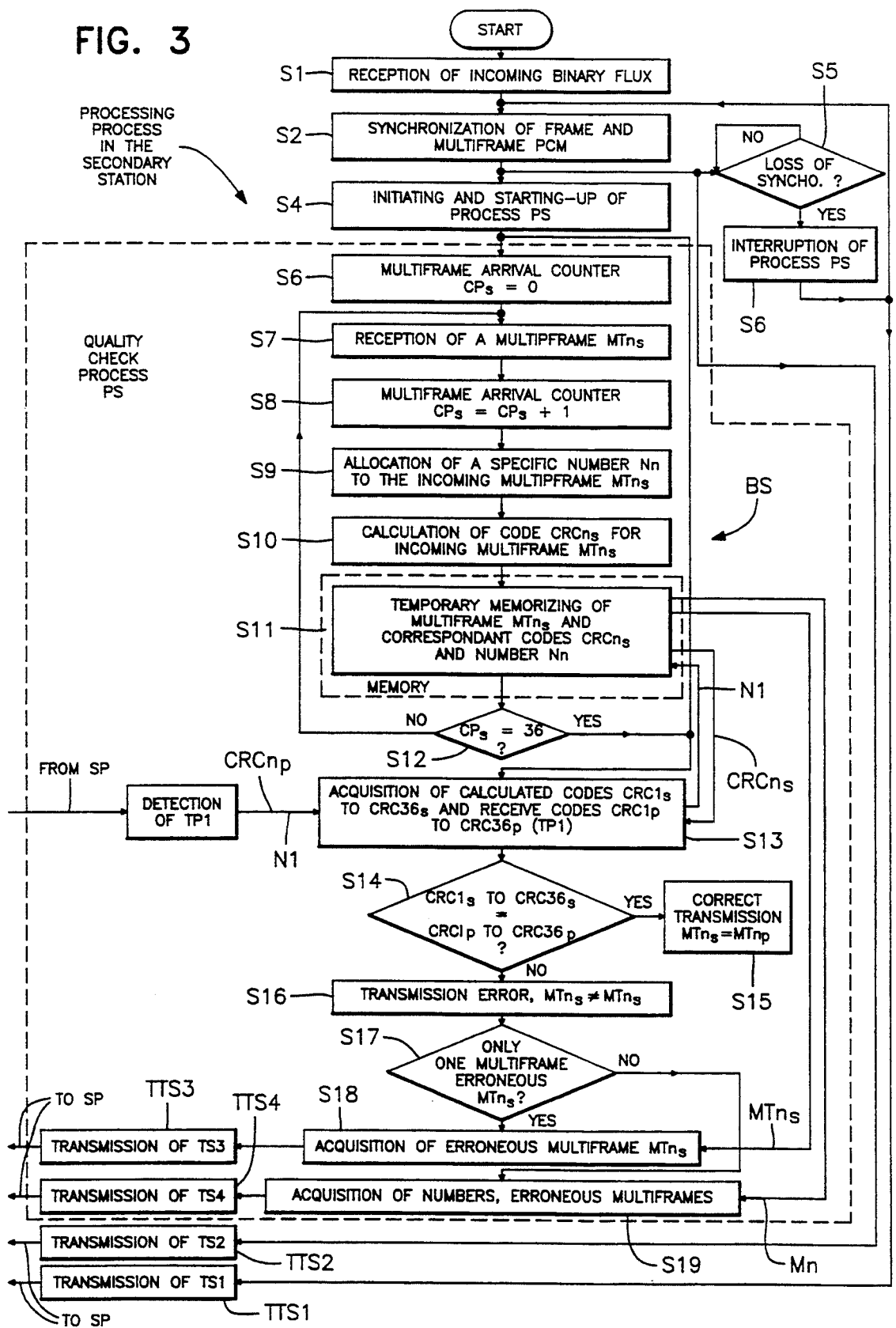

FIG. 7

| ADDRESS AD(HEXA) | | 0 | 1 | 2 | | | | | | | | | | | E | F |
|---|---|---|---|---|---|---|---|---|---|---|---|---|---|---|---|---|
| | 00000 | MVT | | | EVEN FRAME PCM | | | | | | | | | | | |
| | 00010 | | | | ODD FRAME PCM | | | | | | | | | | | |
| | 00020 | | | | EVEN FRAME PCM | | | | | | | | | | | |
| MULTIFRAME MT512 | 00030 | | | | ODD FRAME PCM | | | | | | | | | | | |
| | 00040 | MVT | | | | | | | | | | | | | | |
| | 00050 | | | | | | | | | | | | | | | |
| | 00060 | | | | | | | | | | | | | | | |
| | 00070 | | | | | | | | | | | | | | | |
| AD1 | 00080 | MVT | | | | | | | | | | | | | | |
| | 00090 | | | | | | | | | | | | | | | |
| | 000A0 | | | | | | | | | | | | | | | |
| | 000B0 | | | | | | | | | | | | | | | |
| | | MVT | | | | | | | | | | | | | | |
| | | MVT | | | | | | | | | | | | | | |
| MULTIFRAME MT1 | | MVT | | | | | | | | | | | | | | |
| | | MVT | | | | | | | | | | | | | | |
| | | MVT | | | | | | | | | | | | | | |
| | | MVT | | | | | | | | | | | | | | |
| | | MVT | | | | | | | | | | | | | | |
| | 00260 | | | | | | | | | | | | | | | |
| | 00270 | | | | | | | | | | | | | | | |
| AD2 | 00280 | MVT | | | | | | | | | | | | | | |
| MULTIFRAME MT512 | 00290 | | | | | | | | | | | | | | | |

1 BOX = 1 OCTET OB

QUALITY CHECK EQUIPMENTS FOR DIGITAL TRANSMISSION LINKS

BACKGROUND OF THE INVENTION

1. Field of the Invention

The present invention relates in a general way to the quality check of a digital transmission link in the presence of real traffic. More particularly, the invention relates to quality check equipments complying with the CCITT recommendations on this matter, indicating transmission errors at bit level and in which the error detection preferably uses a cyclic redundancy coding (CRC).

2. State of the Prior Art

The gradual implementation of the integrated services digital telecommunications networks such as French ISDN network "NUMERIS" and the advent of the associated digital services point to increased demand from users with regard to quality in the forthcoming years. All-digital systems theoretically authorize precise quantitative measurements of transmissions quality and it is desirable to do away with all quality criteria of a subjective type in both data transmission and voice transmission.

In the recommendation G-821, Geneva 1980, pages 30 to 40 the CCITT International Telegraph and Telephone Consultative defined quality parameters for digital sections, links and paths throughout a network with or without switching exchanges. The measurement of these quality parameters currently requires the link in question being temporarily turned off and the injection into the link of a pseudorandom digital sequence of which the composition is known in advance. A comparison between the transmitted sequence and the received sequence enables rigourous bit-level detection of the transmission errors, and the quality parameters according to the CCITT recommendation are then calculated.

In the state of the art, there is no equipment available for measuring the CCITT quality parameters in a link in the presence of real traffic. Moreover, the errors detected by using cyclic redundancy codes generally concern a set of channels carried by the checked link and these errors cannot be specifically attributed to said channels.

OBJECT OF THE INVENTION

The main object of this invention is to meet the new quality check requirements of the above-mentioned digital links and to provide equipments for checking the quality of the links at bit level and in the presence of real traffic.

SUMMARY OF THE INVENTION

Accordingly, an equipment embodying the invention for checking the quality of a digital transmission link in the presence of real traffic, in which are provided first and second checking stations connected to first and second ends of the link for calculating first and second check information relating to groups of transmitted frames and to groups of received frames respectively, and for detecting transmission errors after comparisons between the first and second check informations, is characterized in that it comprises a service link connecting the first and second stations for transmitting notably the check information and the frame groups concerned by the transmission errors, and means distributed among the first and second stations for analyzing at bit level the frame groups concerned by the transmission errors, and for producing statistical informations and recordings relating to said errors.

Preferably, the distributed means comprise means for synchronizing the operating of the first and second stations, means for numbering the frame groups concerned by the transmission errors and the corresponding check information, first means for temporarily storing the frame groups and the check information, means for comparing bit-by-bit the first and second frame groups concerned by the transmission errors, and second means for storing the results of the comparison of the frame groups as well as informations relating to the instants of occurrence of the transmission errors, and means for processing the results and information contained in the second storing means thereby deriving said statistical information and recordings.

BRIEF DESCRIPTION OF THE DRAWINGS

The invention will be better understood from the following description of several preferred embodiments of the quality check equipment embodying the invention in reference to the corresponding accompanying drawings in which:

FIG. 3 shows in organization-chart form the processings carried out in a secondary station of the equipment;

FIG. 7 shows an example of space occupation by PCM multiframes of a storage circular memory included in a station of the equipment embodying the invention.

DESCRIPTION OF THE PREFERRED EMBODIMENTS

Figure 1:
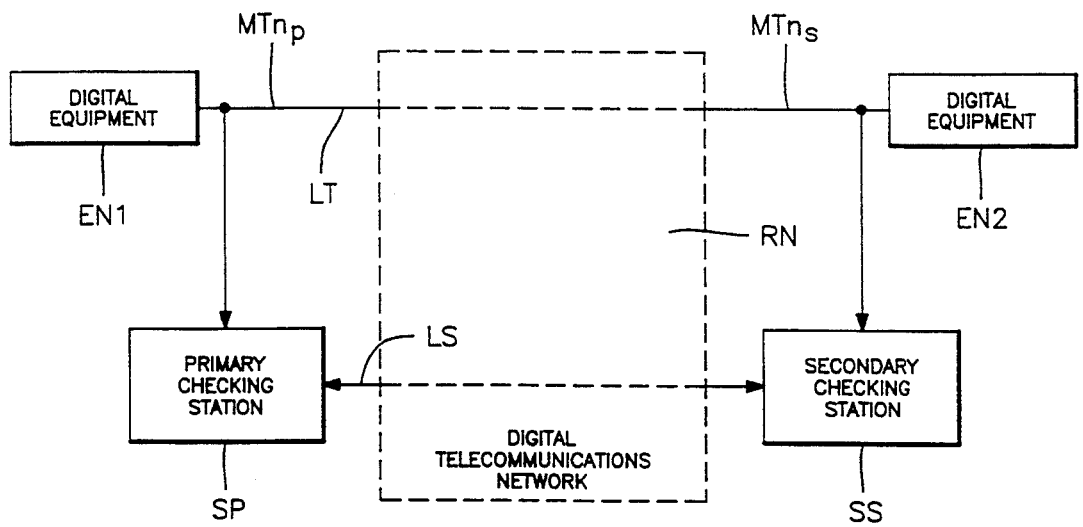
FIG. 1 schematically shows the structure of the equipment embodying the invention comprising two checking stations respectively located at two ends of the link checked and connected to one another via a service link.

In reference to FIG. 1, the equipment embodying the invention is used for checking the transmission quality e.g. of a digital unidirectional link LT carrying PCM frames and multiframes at 2 Mbit/s between a first digital equipment EN1 and a second digital equipment EN2.

The transmission quality check equipment embodying the invention comprises two checking stations, respectively called primary checking station SP and secondary checking station SS, respectively connected to the transmission and reception ends of the link LT carrying PCM multiframes. Multiframes $MTn_p$ are transmitted from the digital equipment EN1 and received by primary station SP and, after routing via link LT, corresponds to PCM multiframes, $MTm_s$, received by secondary station SS and the digital equipment EN2 by a service link LS of typically 64 kbit/s and with a HDLC-type protocol. The links LT and LS are derived e.g. through a telecommunications digital network RN of the ISDN type. The link LT is a unidirectional link carrying 32 PCM channels from the equipment EN1 to the equipment EN2. The link LS is preferably a bidirectional link e.g. of the 64 kbit/s symmetrical type for each transmission direction. According to another embodiment, the service link LS is supported by dedicated PCM channels carried by the link LT.

In reference to FIGS. 2 to 5 are now described the processing processes implanted in the stations SP and SS as well as exchanges of information carried out between said stations via the service link LS.

Figure 2:
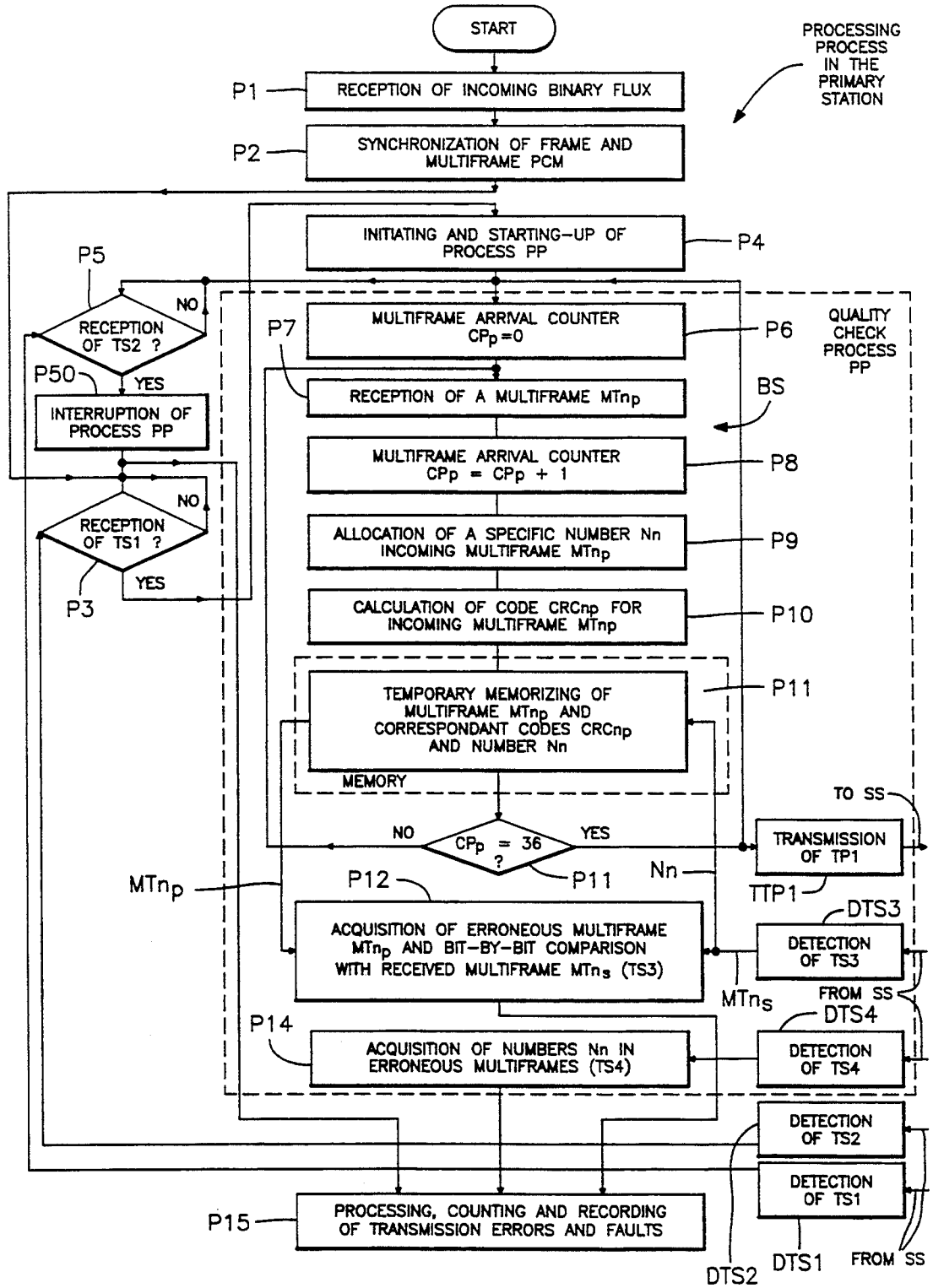
FIG. 2 shows in organization-chart form the processing carried out in a primary station of the equipment.

As shown in FIG. 2, a first processing (block P1) carried out in the primary station SP consists in receiving and processing the incoming 2-Mbit/s binary flow. The incoming binary flow is received according to a line code such as HDB3 and is transcoded into a conventional binary code.

A recovering of the synchronization of the PCM frames and multiframes carried by the incoming binary flow is then carried out (block P2). The recovering of the synchronization of the PCM frames is conventionally carried out by a synchronizing circuit included in the station. The recovering of the synchronization of the PCM multiframes requires processing by a software program in respect of which further details will be disclosed hereinunder in reference to FIGS. 6 and 7.

When the synchronization is effective in the primary station SP, a synchronization waiting loop (block 3) is actuated. This loop P3 concerns the reception of a synchronization indicating packet TS1 transmitted by the secondary station SS via the service link LS. When the packet TS1 is detected (block DTS1) in the primary station SP, it indicates to the latter that the secondary station SS is synchronized and operational. The reception of the packet TS1 ends the loop P3 and an initiating and starting-up phase of a quality check process PP is then bootstrapped. During the initiating and starting-up phase P4, the values contained in different registers included in the circuits of the primary station SP are initiated.

After the initiating phase P4, the quality check process PP and a synchronization watching loop (block P5) are actuated in parallel.

The synchronization watching loop P5 scrutinizes the detection, if any (block DTS2), of a synchronization loss indicating packet TS2 transmitted by the secondary station SS to indicate a loss of synchronization. In the event of a loss of synchronization being detected in the secondary station SS, the process PP is suspended (block P50) and the synchronization waiting loop P3 is re-actuated to wait for the reception of another synchronization indicating packet TS1 which is transmitted by the secondary station SS immediately upon recovery of the synchronization. The detection of TS1 ends the loop P3 and the quality check process PP resumes a further initiating and starting-up phase P4 of the process PP at a later stage.

The quality control process PP comprises a processing loop BP having notably for purpose the reception, numbering and temporary memorizing of each of the MIC multiframes $MTn_p$ transmitted in the link LT by the digital equipment EN1. Another purpose of the loop BP is to calculate the cyclic redundancy codes $CRCn_p$ respectively corresponding to the multiframes $MTn_p$. The index n is an integral number lying e.g. between 1 and 36.

In the processing loop BP, initially a multiframe arrival counter $CP_p$ is reset (block P6). The counter $CP_p$ is incremented (block P8) after each reception of a multiframe $MTn_p$ (block P7). A specific identification number Nn is allocated to the incoming multiframe $MTn_p$ (block P9) and the corresponding cyclic redundancy code $CRCn_p$ is calculated (block 10). The multiframe $MTn_p$, the number Nn and the code $CRCn_p$ are then stored (block 11) in a memory. The loop BP is performed permanently so as to process the multiframes $MTn_p$ as they are transmitted by the equipment EN1. The multiframes $MTn_p$, the codes $CRCn_p$ and the corresponding numbers Nn are then considered and processed in groups of e.g. 36 entities.

The purpose of the counter $CP_p$ is to produce an indication (block P12) every time a group of 36 multiframes $MTn_p$, $MT1_p$ to $MT36_p$, has been received and that a corresponding group of codes $CRCn_p$, $CRC1_p$ to $CRC36_p$, is ready to be transmitted to the secondary station SS by means of a packet TP1 (block TTP1).

According to the invention, the detection of transmission errors is preferably carried out by the secondary station SS located at the reception end of the link LT and it is for this purpose that the codes $CRCn_p$ are transmitted in order for the latter codes to be compared with other codes $CRCn_s$ calculated locally in the secondary station SS and corresponding to the received multiframes $MTn_s$.

Subsequent to a check by comparison of the code groups $CRCn_p$, $CRC1_p$ to $CRC36_p$, and $CRCn_s$, $CRC1_s$ to $CRC36_s$, in the secondary station SS, there can be three possible cases.

According to a first case, the two code groups $CRC1_p$ to $CRC36_p$, and $CRC1_s$ to $CRC36_s$, which are compared in the secondary station SS have identical values. The transmission is correct and the 36 multiframes $MTn_s$, $MT1_s$ to $MT36_s$, received by the secondary station SS are identical, within the detection capacity of the cyclic redundancy codes, to the 36 multiframes $MTn_p$, $MT1_p$ to $MT36_p$, transmitted by the primary station SP.

According to a second case, the code groups are compared and two codes of same n-rank $CRCn_p$ and $CRCn_s$ have different values. The received multiframe $MTn_s$ and the transmitted multiframe $MTn_p$ to which the codes $CRCn_s$ and $CRCn_p$ respectively correspond are different subsequent to a transmission error. A packet TS3 containing notably the erroneous multiframe $MTn_s$ and the corresponding number Nn is transmitted from the secondary station SS to the primary station SP. The packet TS3 is detected (block DTS3) in the primary station SP. The number Nn contained in the packet TS3 addresses the multiframe $MTn_p$ in the memory P11. The multiframes $MTn_p$ and $MTn_s$ are compared bit by bit (block P13). The erroneous bits are detected. The corresponding transmission error is then recorded (block P15) in the form of data which include the date and chronometric instant of the error, the number Nn of the erroneous multiframe $MTn_s$ and the numbers in the multiframe $MTn_s$ of the bits in question.

According to a third case, the two code groups are compared and several codes $CRCm_p$ and $CRCm_s$, $CRCp_p$ and $CRCp_s$, $CRCq_p$ and $CRCq_s$ ... have different values. The corresponding received multiframes $MTm_s$, $MTp_s$, $MTq_s$ ... are erroneous and differ from the transmitted multiframes $MTm_p$, $MTp_p$, $MTq_p$ ... The link LT is then highly perturbed and it is not immediately possible to transmit to the primary station SP all the erroneous multiframes due to the flow rate of the service link LS. A packet TS4 containing notably the numbers Nm, Np, Nq ... corresponding to the erroneous multiframes MTm$_s$, MTp$_s$, MTq$_s$ ... is transmitted from the secondary station SS to the primary station SP. The packet TS4 is detected in the primary station SP (block DTS4). According to a first embodiment, the numbers Nn, i.e., Nm, Np, Nq ..., contained in the packet TS4 are read (block P14) and are immediately recorded (block P15) in the form of data also specifying the date and chronometric instant of the transmission error and no other processing is subsequently carried out on the multiframes so as to detect the bits allocated by the transmission error.

According to a second embodiment, the multiframes MTm$_p$, MTp$_p$, MTq$_p$ ... designated by the numbers Nm, Np, Nq ... are recovered and are saved while awaiting the reception of the erroneous multiframes MTm$_s$, MTp$_s$, MTq$_s$ ... which are progressively transmitted by the secondary station SS as a function of the availability of the service link LS. When the different erroneous multiframes MTm$_s$, MTp$_s$, MTq$_s$ ... are present in the primary station SP, a bit-by-bit comparison is made with the multiframes MTm$_p$, MTp$_p$, MTq$_p$ ... and the bits allocated by the transmission error are detected. The result of the processing is then recorded (block 15). This second embodiment is considered further on in reference to FIG. 5.

Furthermore, events such as synchronization loss and interruption of the process PP (block 50) are also recorded (block 15) and the date, the chronometric instant and the duration of the event are specified.

Statistical processings are carried out on all error informations obtained (block 15) so as to supply the quality parameters according to the CCITT.

As shown in FIG. 3, the secondary station SS carries out processings S1, S2, S4 and S6 to S12 on the multiframe MTn$_s$ respectively similar to the processings P1, P2, P4 and P6 to P12 carried out on the multiframes MTn$_p$ (FIG. 2) in the primary station SP.

A counter CP$_s$ (blocks S6, S8 and S12) corresponds to the counter CP$_s$ of FIG. 2 (blocks P6, P8 and P12). The secondary station SS receives multiframes MTn$_s$ via the link LT. The multiframes MTn$_s$ are processed, as are the multiframes MTn$_p$, in 36-multiframe groups by a processing loop BS similar to the processing loop BP. A code CRCn$_s$ is calculated (block S10) for each incoming multiframe MTn$_s$ and is stored with the multiframe MTn$_s$ and the corresponding identification number Nn (block S9) in parallel in memory (block S11).

After PCM frame and multiframe synchronization (block S2), a synchronization indicating packet TS1 is transmitted to the primary station SP (block TTS1) and a synchronization watching loop (block S5) is actuated and operated in parallel to the quality check process PS implemented in the secondary station SS. The purpose of the loop S5 is to detect all synchronization losses in the secondary station SS. When a synchronization loss occurs, the quality check process PS in the secondary station SS is interrupted (block S6), a synchronization loss indicating packet TS2 is transmitted to the primary station SP (block TTS2) and the synchronization phase (block S2) is re-actuated.

When the counter CP$_s$ reaches the value 36, a group of 36 multiframes MTn$_s$, MT1$_s$ to MT36$_s$, has been received and the corresponding codes CRCn$_s$, CRC1$_s$ to CRC36$_s$, are available. The packet TP1 transmitted by the primary station SP is detected (block DTP1) and the codes CRCn$_p$, CRC1$_p$ to CRC36$_p$, are read (block S13) in the packet TP1 as well as the codes CRCn$_s$, CRC1$_s$ to CRC36$_s$, which are addressed in the memory (block S11) from an identification number Nn, N1, read in the packet TP1. The identification number N1 is used for addressing a cell of the memory S11 containing in the first code CRC1$_s$ corresponding to the code CRC1$_p$. The addresses of the cells containing the following codes CRC2$_s$ to CRC36$_s$ are deducted by successive increments from the number N1. The code groups CRCn$_p$, CRC1$_p$ to CRC36$_p$, and CRCn$_s$, CRC1$_s$ to CRC36$_s$, are compared (block S14).

In the event of an equality between the code groups CRCn$_p$ and CRCn$_s$, the transmission of the multiframes MTn$_p$ has been carried out without any error and the received multiframes MTn$_s$ are correct, MTn=MTn$_p$ (block S15). Otherwise, a transmission error has occurred and one or several multiframes MTn$_s$ are erroneous, MTn$_s \neq$ MTn$_p$, (block S16).

When the transmission error only concerns one multiframe MTn$_s$ (block S17), the latter is read (block S18) in the memory S11 and is immediately transmitted to the primary station SP by means of the packet TS3 (block TTS3). When the transmission error concerns several multiframes MTn$_s$ (block 17), the numbers Nn of the erroneous multiframes MTn$_s$ are read (block S19) in the memory S11 and are transmitted to the primary station SP by means of the packet TS4 (block TTS4).

Figure 4:
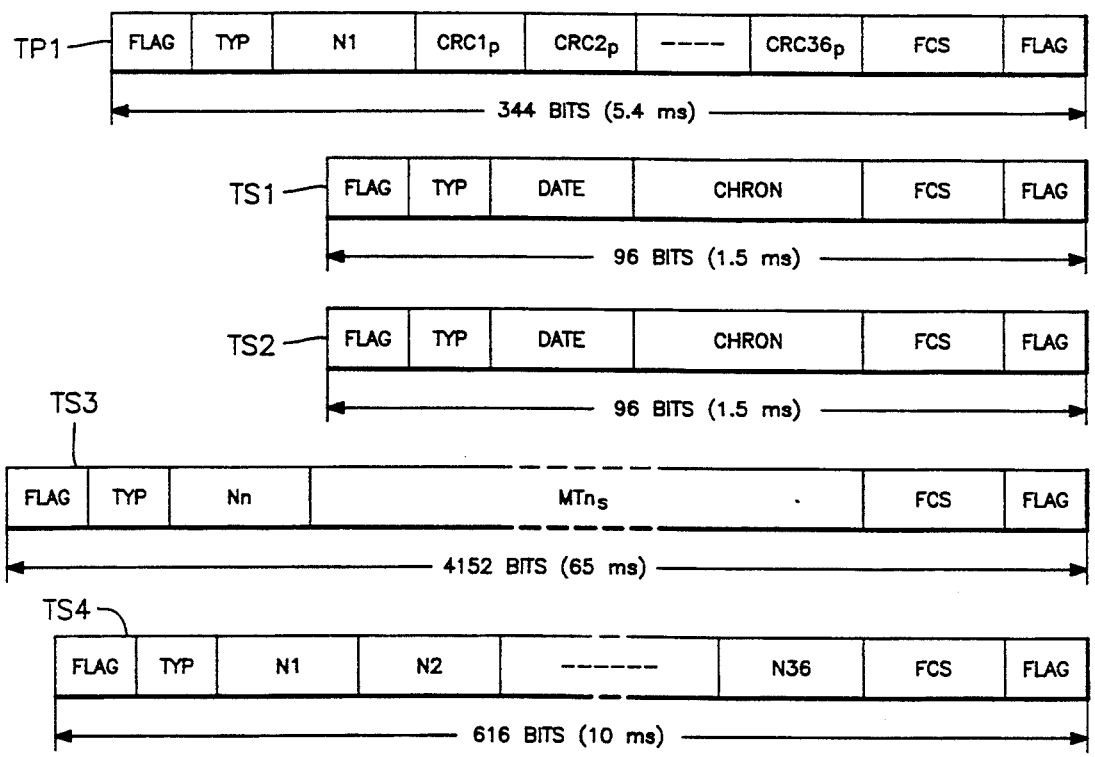
FIG. 4 shows the structures of different packets transmitted between the primary station and the secondary station via the service link.

In reference to FIG. 4, the different packets TP1 and TS1 to TS4 are of the HDLC type and comprise flags "FLAG" for delimiting the beginnings and ends of the packets. A flag FLAG is comprised of an octet "01111110". A two-octet FCS (frame control sequence) control block is also provided in each of the packets. The two octets corresponding to level 2 of the protocol are not discussed and represented here as they do not directly concern the object of the invention.

The CRC code transmission packet TP1 comprises a standard octet TYP="00000110" =06, a group of 36 codes CRCn$_p$, CRC1$_p$ to CRC36$_p$, corresponding to the last group of 36 multiframes MTn$_p$, MT1$_p$ to MT36$_p$, processed in the primary station SP, and a number N1 corresponding to the first multiframe MT1$_p$ of the group. The number N1 and the codes CRCn$_p$ have lengths of two octets and one octet respectively. The packet TP1 is 43 octets long, i.e., 344 bits, and is transmitted via the service link LS in 5.4 ms.

The synchronization indicating packet TS1 comprises a standard octet TYP="00000010"=02, two octets DATE corresponding to the date of the event and indicating the month and the day, and five octets CHRON corresponding to the chronometric instant of the event and indicating the hour, minutes, seconds and thousandths of second. The packet TS1 is 12 octets long, i.e., 96 bits, and is transmitted via the service link LS in 1.5 ms.

The synchronization loss indicating packet TS2 comprises a standard octet TYP="00000100"=04, and octets DATE and five octets CHRON like the packet TS1.

The erroneous multiframe transmission packet TS3 comprises a standard octet TYP="00001000"=08, two octets corresponding to the number Nn of the erroneous multiframe MTn$_s$ and a 512-octet field containing the erroneous multiframe MTn$_s$. The packet TS3 has a total length of 519 octets, i.e., 4152 bits, and is transmitted via the service link LS in 65 ms.

The erroneous multiframe number transmission packet TS4 comprises a standard octet TYP="00001010"=10 and a 36×2-octets field for the transmission of the numbers Nn, N1 to N36, of the erroneous multiframes MTn$_s$. The packet TS4 has a total length of 77 octets, i.e., 616 bits, and is transmitted via the service link LS in 10 ms.

Figure 5:
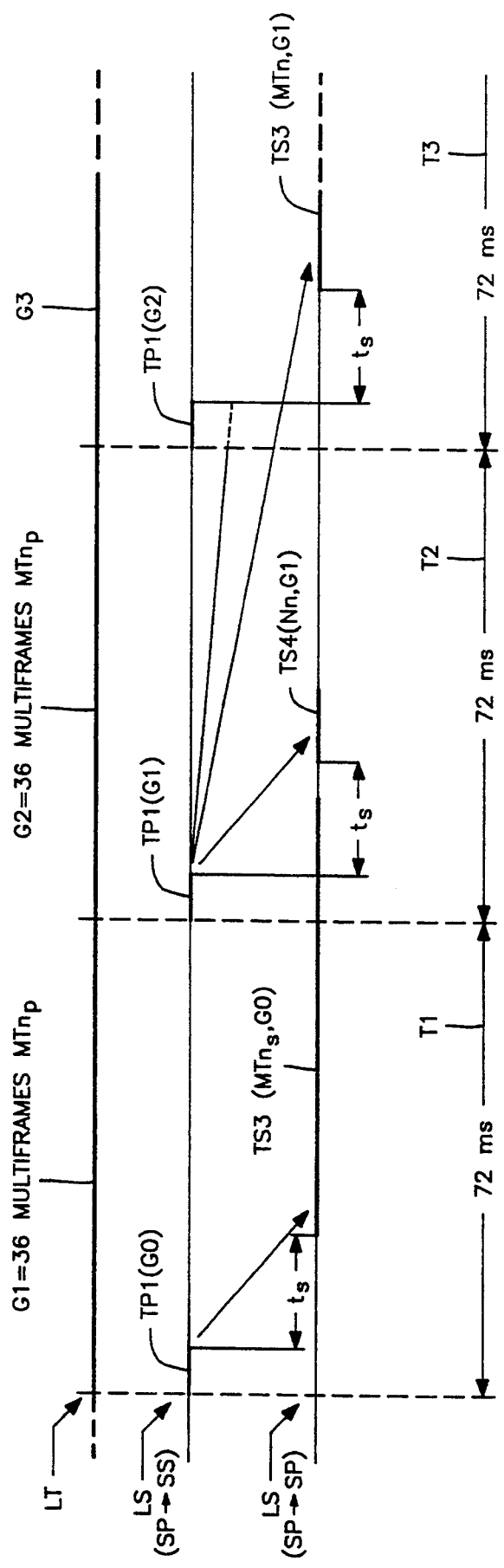
FIG. 5 is a timing chart pertaining to the digital transmissions via the link to be checked and via the service link.

In reference to FIG. 5, the transmission of a group G of 36 multiframes MTn$_p$ via the link LT is carried out in 72 ms, knowing that one PCM multiframe MTn$_p$ comprises 512 octets which are transmitted at 2 Mbit/s in the link LT. The transmission of three groups of multiframes G1, G2 and G3 is shown in FIG. 5. At the start of first, second and third periods of time T1, T2 and T3 corresponding to the transmission of the groups G1, G2 and G3, packets TPI(G0), TPI(G1) and TP1(G2) are respectively transmitted in the link LS (direction SP→SS). The packets TP1(G0), TP1(G1) and TP1(G2) contain the groups of codes CRCn$_p$ respectively corresponding to a group G0 transmitted prior to the group G1, the group G1 and the group G2.

During the period T1, the example under consideration supposes one of the multiframes MTn$_p$ of the previously transmitted group G0 have been detected as erroneous by the secondary station SS. A time interval t$_s$ is necessary for the secondary station SS to process the codes CRCn. At the end of this time interval t$_s$, the secondary station SS transmits to the primary station SP a packet TS3 containing the erroneous multiframe MTn$_s$ of the group G0.

During the period T2, several multiframes MTn$_s$ of the group G1 are detected as erroneous in the secondary station SS. After the time interval t$_s$ required to process the codes CRCn, the secondary station SS transmits to the primary station SP a packet TS4 containing the numbers Nn of the erroneous multiframes MTn$_s$ of the group G1. The packet TS4 is received by the primary station SP and the corresponding multiframes MTn$_p$ are saved.

Let us consider the multiframes of the group G2 to have been correctly received MTn$_s$=MTn$_p$ in the secondary station SS. During the period T3, a time interval is available in the direction SS→SP of the link LS and the secondary station SS uses this available interval to transmit a packet TS3 to the primary station SP. The packet TS3 contains a first erroneous multiframe MTn$_s$ of the group G1 received during the period T2. At a later stage, the secondary station SS continues to use every available time interval during the periods T to progressively transmit all the erroneous multiframes MTn$_s$ of the group G1 to the primary station SP. When all the erroneous multiframes MTn$_s$ have been received by the primary station SP, they are compared bit-by-bit with the corresponding multiframes MTn$_p$ so as to detect the transmission errors at bit level and to proceed to the corresponding recordings.

Figure 6:
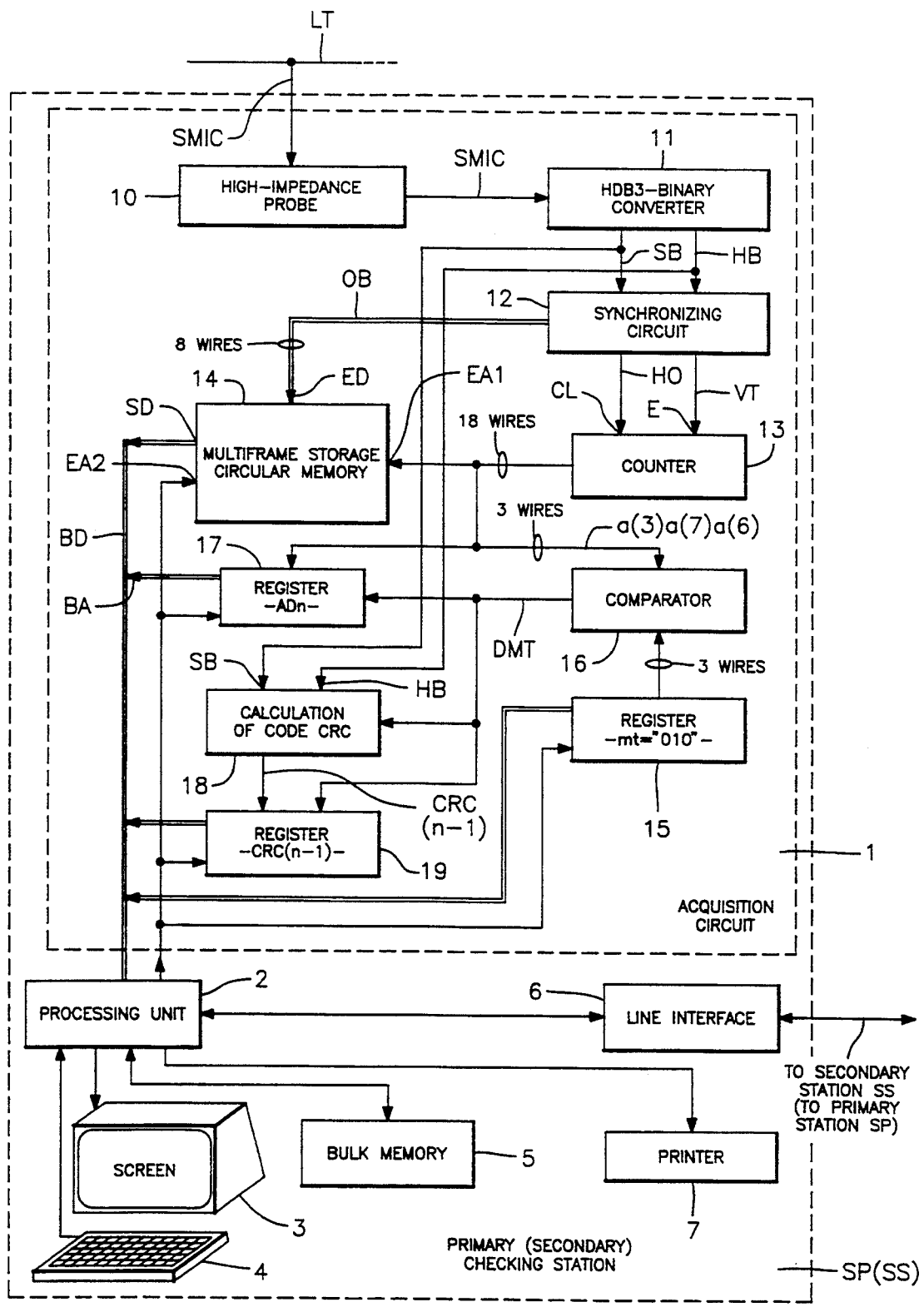
FIG. 6 is a detailed block diagram one of the primary and secondary stations.

In reference to FIG. 6, the primary checking station SP and the secondary checking station SS are similar and mainly comprise an acquisition circuit 1, a processing unit 2, man-machine communication means in the form of a screen 3 and keyboard 4, a bulk memory 5, a line interface 6 and a printer 7.

The acquisition circuit 1 comprises a high-impedance probe 10, a HDB3-to-binary converter 11, a synchronizing circuit 12, a counter 13, a multiframe storage circular memory 14, a first register 15, a comparator 16, a second register 17, a cyclic redundancy code (CRC) calculating circuit 18 and a third register 19.

The input of the probe 10 is connected to the link LT and receives a transmission signal SMIC in the line code HDB3. The probe has a high-impedance input and is designed not to disturb the signal SMIC carried by the line LT. The station SP(SS) operates in the "spy" mode. The output of the probe 10 derives the signal SMIC amplified to an adequate level. The signal SMIC derived by the probe 10 is supplied to the converter 11.

The converter 11 ensures the recovery of a bit timing clock signal HB contained in the signal SMIC as well as the transcoding of the signal SMIC in HDB3 code into a signal SB in binary code. The signals SB and HB are applied to corresponding inputs of the synchronizing circuit 12 and of the CRC code calculating circuit 18.

The synchronizing circuit 12 is a conventional type circuit and comprises comparing, counting and series-to-parallel converting means. The circuit 12 detects every one of the frame alignment words (MVT) contained in the signal SB and issues a synchronization indicating signal VT="1" when the frame is effectively synchronized. Furthermore, the circuit 12 carries out a series-to-parallel conversion of the signal SB and issues frame octets OB and an octet timing clock signal HO. The signals VT and HO are respectively supplied to inputs E and CL of the counter 13. The octets OB are applied to parallel data inputs ED of the storage circular memory 14.

The counter 13 is a binary modulo-$2^{18}$ counter. The signal VT in the state "0" resets the counter at the value 0 and keeps it locked at this value. The signal VT in the state "1" frees the counter 13 and its content is then incremented at the rhythm of the signal HO applied to the clock input CL. At output, the counter issues addresses AD that are applied to first address inputs EA1 of the storage circular memory 14 and to data inputs of the register 17.

The circular memory 14 is a double access memory having parallel data outputs SD and second address inputs EA2 respectively connected to a data bus BD and to an address bus BA of the processing unit 2. The size of the circular memory is typically 256K octets and enables storage of 512 PCM multiframes, MTn, each having 512 octets. The memory 14 is a circular memory, i.e., it is managed in such a way that the incoming multiframes "overwrite" the chronologically oldest multiframes, and are memorized in the corresponding data cells of the memory. The access of the processing unit 2 to the memory 14 is of the DMA type and authorizes fast savings of the multiframes in the bulk memory 5. The typical size, 256K octets, of the memory 14 can prove to be insufficient notably in the case where the service link LS is derived through several switching exchanges, in indeterminate number, of a telecommunications network, and may need to be increased to offset signal transit time variations.

The space occupation configuration of the memory 14 space by the multiframes MTn is temporarily stable due to the counter 13 being kept locked until the signal VT jumps to the state "1", the jumping occurring simultaneously with the transmission of a frame alignment word OB=MVT to the data inputs ED of the memory 14, and due to the fact that the size of the memory 14 is an integral multiple of the size of a multiframe. An example of occupation configuration of the memory 14 is shown in FIG. 7.

Also in reference to FIG. 7, a first multiframe MT1 memorized in the memory 14 occupies e.g. the data cells having addresses AD=00080 to AD=00270 (in hexadecimal), a second multiframe MT2 occupies the data cells having addresses AD=00280 to 00470, . . . a 511th multiframe MT511 occupies the data cells having addresses AD=3FC80 to AD=3FE70, and a 512th multiframe MT512 occupies the data cells having addresses AD=3FE80 to AD=00070.

The locating of the first multiframe MT1 in the space of the memory 14 is carried out by software processing. The processing unit 2 proceeds to read the 512 first octets contained in the memory 14 (from AD=00000 to AD=001FF) and processes them so as to detect a multiframe alignment word and to deduce the start address AD1=00080 of the first multiframe MT1 from the detected location of said multiframe alignment word. The address AD1 is memorized in a location of file of the bulk memory addressed by the multiframe number Nn=N1. The detection of the value of the address AD1=00080 is a first step of the multiframe synchronization. A second step of the multiframe synchronization consists in attributing to a three-bit word mt the values of three bits of the address AD1 pertaining to the counting of the multiframes in the memory 14 and in writing the word mt in the register 15. The processing unit 2 has access to the register 15 via the address and data buses BA and BD.

Taking the address AD1="00a(17)a(16) . . . a(1)a(0)"=$00080_{hexa}$, a(0) to a(17) being the 18 bits, from the last significant bit (LSB) to the most significant bit(MSB) of the address AD1, the word mt is constituted by the bits a(6), a(7) and a(8), mt="a(8)a(7)a(6)"="010". The word m(t) is included in all the multiframe start addresses AD1=00080 to AD512=3FE80, at the level of the binary portions a(8)a(7)a(6) of said addresses. To detect the multiframe start addresses ADn, one need only detect the addresses AD in which the portion a(8)a(7)a(6) of the addresses is equal to the word mt="010".

The purpose of the comparator 16 is to detect the multiframe start addresses ADn. The comparator 16 respectively receives via first inputs and second inputs the word mt issued by the register 15 and the binary portion a(8)a(7)a(6) of the address AD issued by the counter 13. A signal DMT supplied by the comparator 16 indicates in the state "1" that the start of a multiframe MTn is being received in the acquisition circuit 1. The signal DMT is applied to corresponding inputs of the register 17, of the CRC code calculating circuit 18 and of the register 19.

In the register 17, the signal DMT="1" controls the loading of the start address ADn of the multiframe MTn being received. The processing unit 2 has access to the register 17 via the buses BA and BD and the address ADn read in said register is transferred to a corresponding file in the bulk memory 5.

In the CRC code calculating circuit 18, the signal DMT="1" indicates the start of the multiframe MTn being received and controls the beginning of calculation of the code CRCn. The code CRCn is calculated from the signal SB and from the bit timing clock signal HB. Conventionally, the circuit 18 comprises shift registers and exclusive OR gates. This type of circuit is well known in the state of the art and will not be described here. The signal DMT="1" also controls the transfer of the code CRC(n-1) previously calculated and pertaining to the multiframe MT(n-1) to the register 19.

The register 19 is connected to the address and data buses BA and BD. The signal DMT is applied to a load controlling input and, in the state "1", and controls the loading of the code CRC(n-1) which is transmitted by the CRC code calculating circuit 18 into the register 19. The code contained in the register 19 is then read by the unit 2 and transferred to the bulk memory 5.

The processing unit 2 is e.g. comprised of a 16-bit microprocessor card. Preferably, the unit 2, the screen 3, the keyboard 4, the bulk memory 5 and the line interface 6 are integrated into a commercialized microcomputer. The bulk memory 5 is e.g. constituted by a hard disk of the microcomputer. The line interface 6 is plugged into an interior connector of the microcomputer and connects the processing unit 2 to the service link LS. The printer 7 is provided for producing a printed record of the results of the quality check of the transmission link LT.

What we claim is:

1. Equipment for controlling the quality of a digital transmission link in the presence of real traffic,
said equipment comprising first and second checking stations connected to first and second ends of said transmission link respectively, and a service link means connecting said first and second stations and transmitting, between said stations, only check information and corresponding groups of frames affected by transmission errors,
said first and second stations comprising means for respectively calculating first check information relating to groups of frames transmitted from said first end of said transmission link and second check information relating to groups of frames received at said second end of said transmission link, said equipment further comprising means for detecting transmission errors as a function of comparisons between said first and second check information, and means for analyzing at bit level said groups of frames affected by said transmission errors thereby deriving statistical information and recordings relating to said errors.

2. The equipment according to claim 1, wherein said service link means transmits at least one of said first and second check information between said first and second stations according to a data link level protocol.

3. The equipment according to claim 1, wherein said service link means comprises a digital telecommunications network.

4. The equipment according to claim 1, wherein said service link means comprises allocated data channels of said digital transmission link to be checked.

5. The equipment according to claim 1, wherein said first and second check information calculated in said first and second stations are of cyclic redundancy code type.

6. The equipment according to claim 1, wherein said analyzing means comprises means for synchronizing the operation of said first and second stations, means for numbering said groups of frames affected by transmission errors and said corresponding check information, first means for temporarily storing said groups of frames and said check information, means for comparing bit-by-bit the stored groups of frames affected by transmission errors and respectively transmitted from said first transmission link end and received at said second transmission link end, second means for storing the results of the comparisons between said stored groups of frames as well as instant relating information which relates to instants of occurrence of said transmission errors, and means for processing said comparison results and said instant relating information stored in said second storing means thereby deriving said statistical information and recordings.

7. The equipment according to claim 1, wherein said analyzing means is included in an acquisition circuit connected in spy mode to said digital transmission link and in data processing means such as a microcomputer.

8. The equipment according to claim 1, wherein said frame groups comprise PCM-type frames and multiframes.

* * * * *